C. D. GOLDING.
TRUCK.
APPLICATION FILED SEPT. 29, 1916.
1,280,210.
Patented Oct. 1, 1918.
2 SHEETS—SHEET 1.
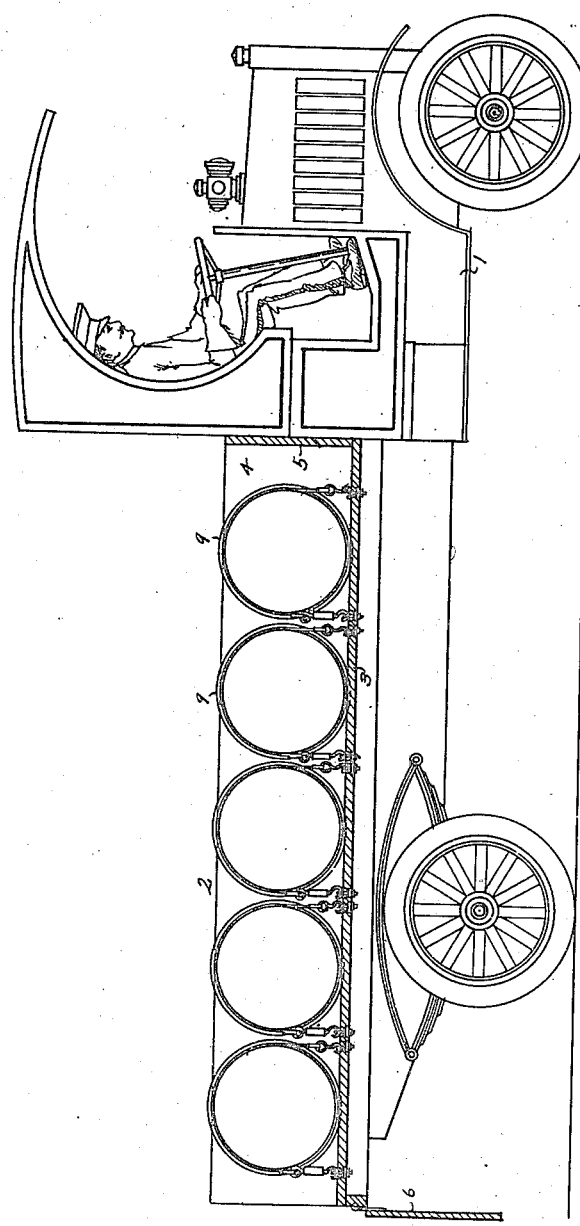
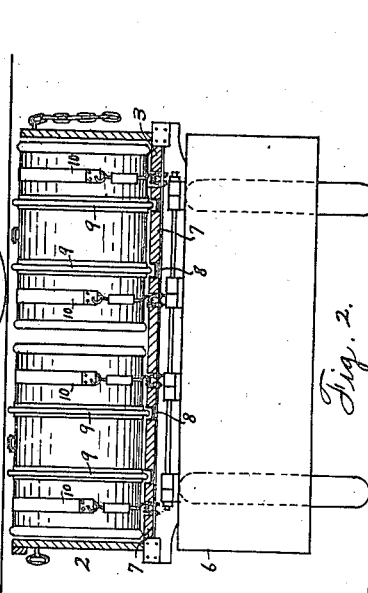
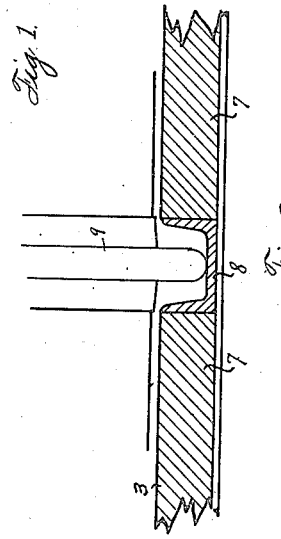
INVENTOR
Charles D. Golding.
BY
Hardway & Cathy
ATTORNEYS

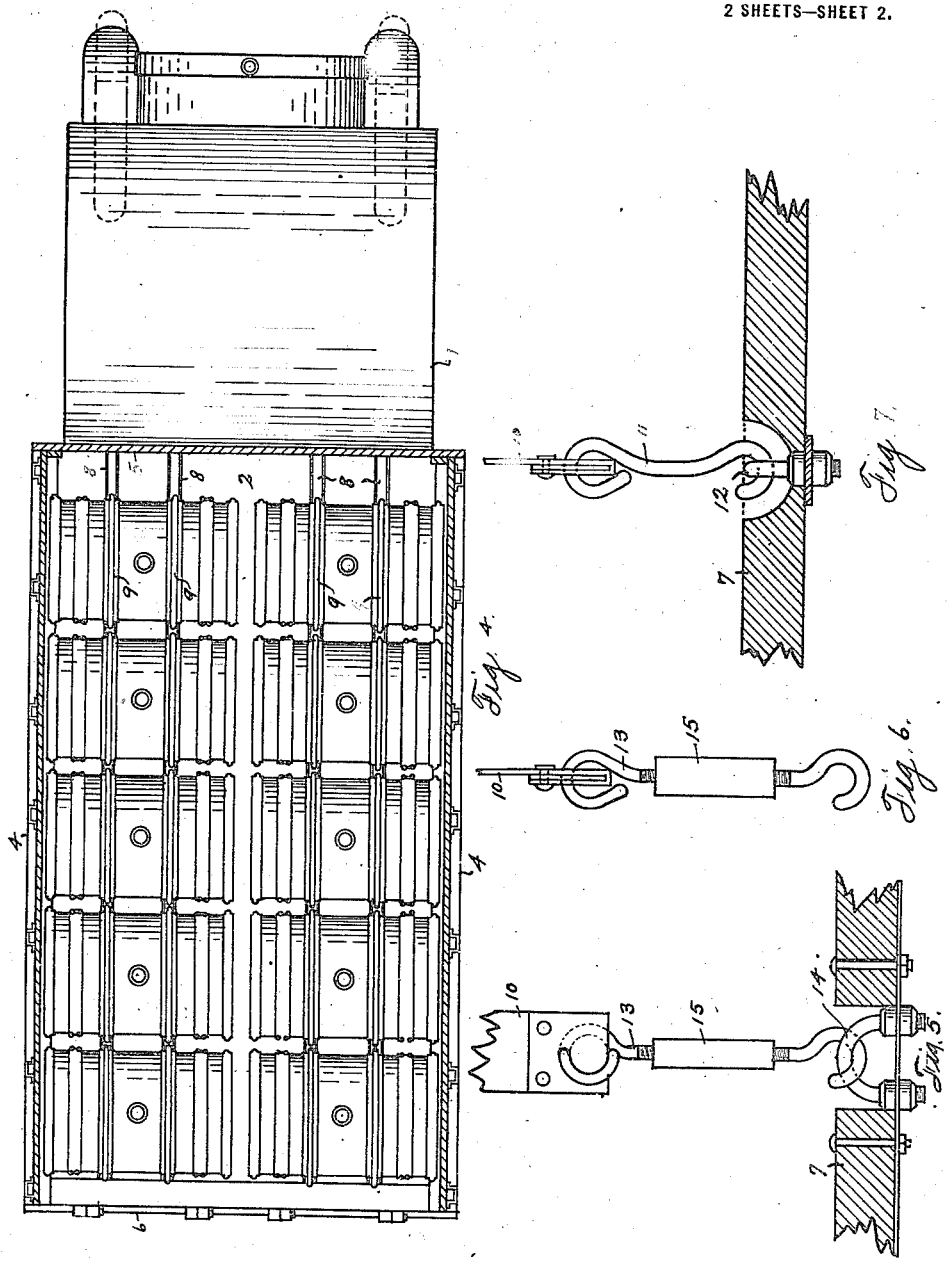

UNITED STATES PATENT OFFICE.

CHARLES D. GOLDING, OF HOUSTON, TEXAS.

TRUCK.

1,280,210. Specification of Letters Patent. Patented Oct. 1, 1918.

Application filed September 29, 1916. Serial No. 122,793.

*To all whom it may concern:*

Be it known that I, CHARLES D. GOLDING, a citizen of the United States, residing at Houston, in the county of Harris and State of Texas, have invented certain new and useful Improvements in Trucks, of which the following is a specification.

This invention relates to new and useful improvements in trucks and is designed more particularly for use in the transportation of drums containing gasolene and other similar liquids.

The object of the invention is to provide a truck equipped with a body, of the character described, wherein the drums containing the gasolene or other liquid may be securely fastened so that in transportation over rough roads the drums will not move about in the body of the truck to the injury of said drums and truck body. This form of truck is especially adapted for use in the supply of gasolene along the line of communication of military operations, to transfer the cargo from the base of operations to filling and storage stations along the line, and may be used also to supply gasolene to individual motor vehicles and for the purposes mentioned, it has been found to be much more adaptable than tank trucks, tank wagons, storage tanks or other similar means now commonly used in commercial trade.

With the above and other objects in view the invention has particular relation to certain novel features of construction, arrangement of parts and use an example of which is given in this specification and illustrated in the accompanying drawings wherein:—

Figure 1 is a side elevation of my improved form of truck, the body thereof being shown in section.

Fig. 2 is a transverse sectional view thereof.

Fig. 3 is an enlarged fragmentary transverse sectional view thereof.

Fig. 4 is a plan view thereof.

Fig. 5 is a fragmentary view partially in section showing one end of the securing straps and means for securing the same to the bottom of the truck body.

Fig. 6 shows an edge view of said strap and securing means and,

Fig. 7 shows an edge view of the opposite end of said strap and the means for securing the same to the bottom of the truck body.

Referring now more particularly to the drawings wherein like numerals of reference designate similar parts in each of the figures, the numeral 1 refers to a truck of any approved form which is provided with the body 2. This body is composed of the bottom 3, the sides 4, 4, and the front end 5, all fixed in position relative to each other and it is further equipped with the rear end gate 6 which is hinged thereto as illustrated in Figs. 1 and 2 so that it can be opened for loading and secured in closed position during transportation. The bottom 3 is composed of lengthwise boards as 7 which are spaced apart, and interposed between the respective boards are the channels 8 extending from end to end of the body and secured firmly in position. The upper edges of the flanges of these channels are flush with the floor surface and the channels are arranged in pairs, as shown in Figs. 2 and 4 forming tracks.

Standard gasolene drums as now commonly used for the storage and transportation of gasolene are constructed of metal and provided with annular reinforcing ribs 9, 9, said ribs being spaced apart and forming bumpers for the protection of the drums, as well as means for transporting or rolling the individual drums from place to place.

It will be understood that the depth of the tracks is such as to support the body of the drums clear of the bottom of the truck.

It is contemplated that each truck body will be provided with two tracks, the channel irons forming each track, being spaced apart the required distance to receive, and form tracks for the ribs 9, 9 of the drum. A standard truck of this character has the capacity to receive two rows of drums each row containing five drums and each drum will usually contain fifty five gallons of liquid, the ten drums filled to capacity weighing five thousand one hundred and twenty five pounds.

As the drums are placed in position in the truck body they are secured at the desired place by means of the straps 10, 10, one strap being secured around one end of each drum. One end of each strap is provided with a hook which is pivoted to said end and which engages with a U-bolt 12 secured to the bottom of the body and the other end of said strap has a substantially similar hook 13 provided to engage with the U-bolt 14 which is carried by the bottom of the body.

The hook 13 is provided with a turn buckle 15 and the straps 10 are passed around the ends of the drum and the hooks 11 and 13 engaged in the corresponding U-bolts 12 and 14, and the turn buckle 15 then manipulated so as to tighten the straps and secure the drum firmly in position. It is obvious that the straps may be readily removed by loosening said turn buckle. The U-bolts referred to are fixed in recesses in the bottom of the body so as to be flush with the upper surface of the bottom. When it is desired to use the truck for general transportation purposes the straps 10 may be removed presenting a comparatively smooth bottom.

In loading the trucks, a skid-way of any well known form may be employed to elevate the drums into the body and said drums are rolled along said tracks and secured in position at the desired place, one at a time.

It is obvious that when so secured in position the drums will be held against movement or contact against one another, however, rough or uneven the road may be over which the truck moves and will thus be protected from injury as well as from injuring the truck body.

What I claim is:

1. A truck body having tracks along the bottom thereof to receive the annular ribs of drums, said tracks being flush with said bottom, the bottom being provided with recesses on opposite sides of said tracks, U-bolts secured in said recesses, flexible straps adapted to be secured around the ends of the drums, hooks carried by the ends of said straps and engaging in corresponding U-bolts, and means for varying the length of each strap.

2. A truck body having tracks along the bottom thereof to receive the annular ribs of drums, said tracks being flush with said bottom, the bottom being provided with recesses on opposite sides of said tracks, securing means in the recesses flush with the bottom, flexible straps adapted to be secured around the ends of the drums, and engaging means carried by the ends of the straps to engage with the means in said recesses.

3. A truck body for transporting drums having annular ribs, a bottom for said body, and sunken portions in said bottom, tracks in said sunken portions adapted to receive the ribs of the drums and support the body of the drums clear of said bottom.

4. A truck body having a bottom, tracks formed in said bottom flush therewith adapted to receive the annular ribs of a drum, straps passing partially around each drum and means flush with said bottom to which the ends of said straps are secured.

5. A truck body having a bottom, tracks in said bottom adapted to receive the annular ribs of a drum, straps passing partially around each drum, securing means for said straps flush with said bottom to which the ends of said straps may be secured.

In testimony whereof I have signed my name to this specification in the presence of two subscribing witnesses.

CHARLES D. GOLDING.

Witnesses:
F. A. LIDDELL,
FLORENCE JOHNSTON.